United States Patent
Boukobza et al.

(10) Patent No.: US 7,147,716 B1
(45) Date of Patent: Dec. 12, 2006

(54) ROOF LINING OF A VEHICLE AND A METHOD FOR PRODUCING SAME

(75) Inventors: Alain Boukobza, Menucourt (FR); Jean Francois Daniel, Carriere Sous Poissy (FR); Emmanuel Reymond, Poissy (FR); Thorsten Alts, Gross Bieberau (DE)

(73) Assignee: Rieter Automotive (International) AG, Zollikon (CH)

( * ) Notice: Subject to any disclaimer, the term of this patent is extended or adjusted under 35 U.S.C. 154(b) by 195 days.

(21) Appl. No.: 10/130,789

(22) PCT Filed: Nov. 23, 2000

(86) PCT No.: PCT/CH00/00625

§ 371 (c)(1),
(2), (4) Date: May 23, 2002

(87) PCT Pub. No.: WO01/40025

PCT Pub. Date: Jun. 7, 2001

(30) Foreign Application Priority Data

Dec. 3, 1999 (CH) ................................. 2221/99

(51) Int. Cl.
*B60R 13/02* (2006.01)
*B32B 5/18* (2006.01)
(52) U.S. Cl. .................. 118/286; 118/288; 118/290; 428/304.4; 428/316.6; 428/317.5; 428/340
(58) Field of Classification Search .............. 181/284, 181/286, 289–290, 294; 428/304.4, 316.6, 428/317.5, 340
See application file for complete search history.

(56) References Cited

U.S. PATENT DOCUMENTS

| 5,258,089 A | 11/1993 | Tanaka et al. |
| 5,582,906 A * | 12/1996 | Romesberg et al. .......... 442/55 |

FOREIGN PATENT DOCUMENTS

| EP | 0 255 332 | 2/1988 |
| EP | 0 637 820 | 2/1995 |
| FR | 2 503 721 | 10/1982 |
| GB | 2067133 A * | 7/1981 |
| WO | WO 98/18656 | 5/1998 |
| WO | WO 98/18657 | 5/1998 |
| WO | WO 00/27671 | 5/2000 |

* cited by examiner

*Primary Examiner*—Sam Chuan Yao
(74) *Attorney, Agent, or Firm*—Nath & Associates; Gregory B. Kang; Derek Richmond

(57) ABSTRACT

A multifunctional, lightweight and acoustically optimized interior lining for the roof of a vehicle is disclosed. The inventive lining comprises an air permeable core layer, a first stiffening layer, a second stiffening layer and a decor layer. Said layers are connected to one another by means of air permeable adhesive layers. The total air flow resistance of the second stiffening layer, decor layer, and attached adhesive layers, arranged on the side of the core layer facing the passenger compartment, is within the range of 500 Nsm$^{-3}$>$R_r$<3500 Nsm$^{-3}$. The total surface area weight of said layers lies in the range of 300 to 800 gr/m². A method for producing said lining and the use thereof in a roof of a vehicle are also disclosed.

11 Claims, 1 Drawing Sheet

ROOF LINING OF A VEHICLE AND A METHOD FOR PRODUCING SAME

BACKGROUND OF THE INVENTION

1. Field of the Invention

The present invention relates to a roof lining for a vehicle roof, to a method for producing the same and to the use thereof in a vehicle roof.

2. Description of the Related Art

Vehicle roof linings are important components for the interior lining of vehicles. Essentially, they affect the acoustic characteristics of the vehicle, they should be aesthetically pleasing and should be sufficiently stiff in order to support accessories such as, for example, sun visors, interior lighting, ventilation slits, clothes hooks etc. Furthermore these linings should be lightweight, should be economically manufacturable, should be easy to install, and should fulfil a number of criteria (fire resistance, emission of toxic or noxious fumes etc.).

Vehicle parts having large surface areas, in particular vehicle roofs, tend to vibrate on traveling on account of their low inherent stability. This behavior is conventionally counteracted by mounting damping material, in particular heavy layers containing bitumen. Traditionally multi-layered roof lining elements are used which have only an aesthetic function and serve to support accessories.

An acoustically effective roof lining is known, for example, from EP 0,255,332, and comprises a semi-flexible carrier layer with which, in the manner of a snap closure, the roof lining can be tensioned against the vehicle roof. With this carrier layer a classic spring-mass-system with a resilient, sound-absorbing foam layer and a visco-elastic, closed-pored heavy layer (filled with bitumen) is pressed against the vehicle roof.

EP 0,637,820 for example discloses a sound absorbing roof lining, which essentially comprises an approximately 5–15 mm thick, semi-rigid polyurethane (PU) foam layer and a 4–10 mm thick, spring elastic compound fiber layer, both layers being permeable to air. In this embodiment, the foam layer is reinforced on both its sides with glass fibers and, on the passenger compartment side, comprises an air permeable décor layer. The individual layers are, in turn, connected to each other by means of an air permeable adhesive layer, and in particular by a PU-adhesive. However, this sound absorbent roof lining is a classical spring-mass-system or a classical foam absorber.

As it is the general aim of the automobile industry to reduce the weight of vehicles, these systems have proven to be too heavy for modern requirements of the automobile industry. As a result, ever thinner and lighter lining elements are used, which however, have an insufficient acoustic effectiveness, for example for sound absorption purposes, and in particular in the range below 1000 Hz.

Multi-layered vehicle roof linings are also known which are lightweight and stiff, but which also have a poor acoustic performance.

Thus, FR 2,503,721 suggests a lightweight roof lining, which essentially comprises a porous and glass fiber reinforced foam layer being covered with a décor layer, and having an air-impermeable polyethylene foil between the décor layer and the glass fiber reinforced foam layer in order to prevent the permeation/penetration of adhesive components through the décor layer. This foil results in an insufficient acoustic absorption capacity of the roof lining, which could possibly be improved by applying perforations. However, such perforations in the polyethylene foil can cause visually perceptible changes to the décor layer.

Therefore, in WO98/18657 there is described an ultra-light, multifunctional assembly, with which an excellent acoustic comfort in the vehicle interior can be achieved, and at the same time achieving a weight reduction of about 50% in comparison to linings having a classic spring-mass-system and an improved aesthetic durability. This publication describes the composition of an acoustically and aesthetically satisfactory vehicle roof lining, however without describing the method of manufacture.

BRIEF SUMMARY OF THE INVENTION

It is therefore the object of the present invention to provide an ultra-light vehicle roof lining of the new generation, which can be manufactured simply and thus cost efficiently.

In particular it is the object of the present invention to provide a vehicle roof lining which is light-weight, self-supporting, highly acoustically effective, aesthetically pleasing and maintains its aesthetic appearance. Furthermore, the inventive lining should be able to be easily acoustically adjusted and should allow for as wide a range of various décor materials as possible.

It is thus also the object of the present invention to provide a method for manufacturing light-weight roof linings which can be variably designed so as to meet the desired acoustic and aesthetic requirements.

According to the invention this object is achieved by a lining with the features of claim 1, which can be manufactured by a method according to claim 10. In particular this multifunctional and lightweight inner lining has a multilayered structure and comprises an air impermeable core layer, in particular comprising a thermoformed PU foam which is provided on both its surfaces with an air permeable stiffening layer (which, in turn, can be composed of a number of layers).

On the passenger compartment side, this multilayered structure has an air permeable décor layer, whilst an air impermeable backing layer can be arranged on the vehicle roof side. These layers are adhesed to each other by thermoplastic, air permeable adhesive means. Between the décor layer and the stiffening layer on the passenger compartment side a thin perforated foil is preferably used as adhesive means, which foil partially opens during the manufacturing process and adheres to the adjacent layers. The air flow resistance of the layers which are adjacent the foamed core layer on the passenger compartment side can be specifically and easily adjusted by choice of the composition and compaction (spacial weight) of the stiffening layer and by suitable choice of the adhesive layer and the décor layer, i.e. can be simply and controllably adjusted to the specific requirements. According to the invention this combination of layers is composed such, that an air flow resistance of 500 Nsm$^{-3}$<$R_r$<2500 Nsm$^{-3}$, and in particular 900 Nsm$^{-3}$ <$R_r$<1900 Nsm$^{-3}$ is achieved, whilst the area weight of this combination of layers is between 0.3 to 0.8 kg/m$^2$. For optimizing the acoustic efficiency of the vehicle roof lining it is essential that the air flow resistance of those layers on the passenger compartment side which are arranged before the core layer lies within the desired range. The décor layer can be made of a nonwoven or some other air permeable material, for example a compacted textile with or without a thin, open-celled foam layer. Furthermore, it is essential for the acoustic efficiency of the vehicle roof lining that, if the side facing the metal roofing sheet is sealed, the layer required for such sealing has a low area weight (less than 50 gr/m²) and that this layer is coupled to the other layers of the supporting structure in a suitable manner.

This vehicle roof lining distinguishes itself by its particularly good acoustic performance and by the fact that it is self-supporting and ultra-light.

DETAILED DESCRIPTION OF THE INVENTION

Figure 1:
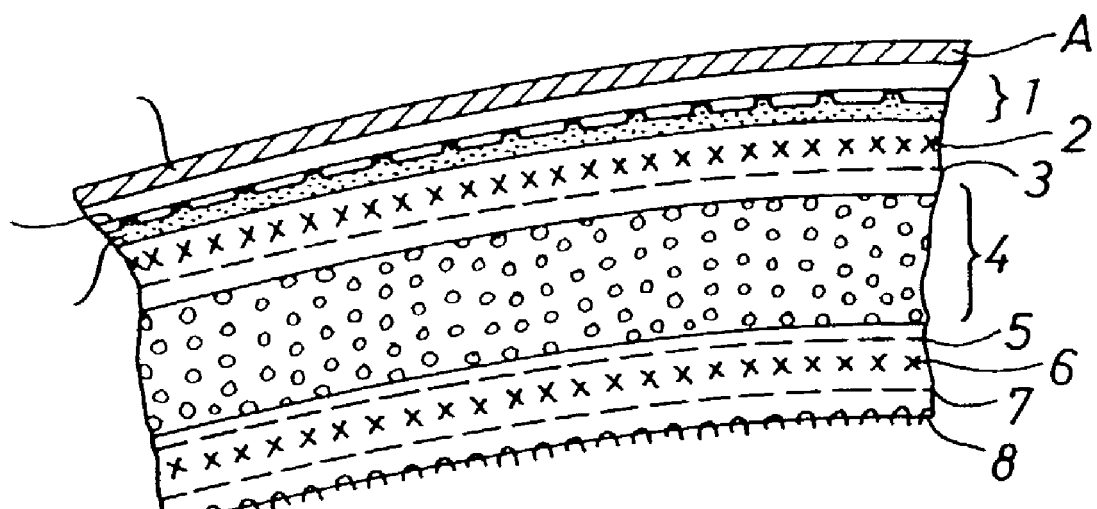
FIG. 1 shows a preferred embodiment of the roof lining according to the invention having the following sequence of layers:
1. an air impermeable nonwoven (about 0.04 kg/m²)
2. a thermoformable nonwoven (about 0.2 kg/m²)
3. an adhesive layer (reticulating adhesive)
4. a thermoformable PU foam core (about 20 mm thick, 0.2 kg/m²)
5. an adhesive layer (reticulating adhesive)
6. a thermoformable nonwoven (0.3 kg/m²)
7. a slitted PE-foil (about 50 μm) or a microporous adhesive fiber layer
8. a décor covering (nonwoven weighing about 0.2 kg/M²)

The embodiment described above can easily be acoustically trimmed by the expert without negatively influencing its advantageous effects. In particular, the thickness of the core layer 4 can be adjusted to meet the requirements, i.e. to have a weight of less than 0.2 kg/M² up to a weight of more than 0.4 kg/M². The décor layer 8 can comprise imaginative textiles or layers having foram backing. The layers 5, 6, 7, 8 on the passenger compartment side can be formed such that their air flow resistance meets the desired acoustic requirements. By varying the stiffening layer 2 on the metal roofing sheet side the stiffness of the entire lining can be adjusted as desired. A variation in the composition of the stiffening layers 2 and 6 is also within the skill of the expert. Also any specific shaping of the roof lining and in particular a specific surface pattern on the rear side of the lining can be freely chosen.

The inventive method for manufacturing such a roof lining has the features of the present claim 10 and aims at providing a stack having the following sequence of layers:
an air impermeable backing layer;
a first air permeable, thermoformable nonwoven;
a first air permeable adhesive layer;
an air permeable, thermoformable PU foam core;
a second air permeable adhesive layer;
a second air permeable, thermoformable nonwoven;
a third air permeable adhesive layer;
an air permeable décor layer.

In a subsequent method step this stack is heated to a temperature of about 180° C. in order to soften the thermoplastic adhesive layers and in order to trigger a secondary reaction of the PU foam core. In a next method step this heated stack is transferred into a cold moulding tool and there is brought into its desired shape whilst the secondary reaction of the PU foam core is completed and the material stack is cooled to a temperature in the range of between 20° C. to 60° C. Subsequently the formed and bonded stack is cut into the desired contour.

This method of manufacture has proven to be advantageous in comparison to conventional methods because by using a thermoformable PU foam core and thermoplastically bonded stiffening layers the roof lining can be formed in a cold moulding tool, thus eliminating seepage of adhesive material. This method especially provides for rapidly transferring the heated stack into the cold moulding tool. Care is taken to minimize the decrease in temperature during the transfer process and this decrease in temperature should amount to less than 20° C. on the stack-surfaces, and preferably less than 10° C.

With this method, for example, a stack having a total thickness of 27 mm is heated to 180° C. For this purpose the stack can be pressed to a total thickness of 22 mm. During this heating phase the adhesives begin to melt, on the one hand, and on the other hand a secondary reaction is triggered in the PU foam core. The cold moulding tool in which the heated stack is cooled within about 1 minute has a temperature of between 20° C. and 60° C. During this cooling process the adhesive layers having a reticulate and/or droplike distribution harden and cause the adjacent layers to bond.

It is evident that this method of manufacture considerably reduces production costs. By using thermoformable foams or nonwovens it is possible to make products which do not emit contaminants/noxious materials. Furthermore, this method allows to dispense with liquid adhesives which lead to stains in the decor layer in conventional roof linings. An essential advantage of the method according to the invention lies in the fact that the acoustic features of the manufactured products can be variably adjusted by means of a simple variation in the thickness and composition of the individual layers or by variation in the perforation density of the adhesive layers. This permits the method to be universally used, i.e. it is suitable for manufacturing differently arranged or dimensioned roof linings without having to rearrange the production line.

The roof lining manufactured according to the inventive method has all the required advantageous features, and in particular it is lightweight, i.e. has a weight of merely about 1000 gr/m², it fulfils the requirements of the automobile industry with respect to the required inherent stiffness and form stability, and fulfils the regulations concerning fire resistance, toxic emissions and so forth. Furthermore, the roof lining according to the invention is not sensitive to humidity, is olfactorily neutral and inhibits fungal growth. The manufacturing method according to the invention is substantially simpler and thus more economical than those currently known.

Preferred embodiments of the roof lining and the method according to the invention show the features of the respective dependent claims.

The invention is explained in more detail by way of the single FIGURE and a description of an embodiment.

FIG. 1 is a schematic illustration of the structure of a lining element according to the invention.

The exemplary embodiment of the roof lining 9 shown in FIG. 1 has a total thickness of 20 mm. This lining has a central core layer 4 which comprises an air permeable material, preferably an open celled thermoformable PU foam. This foam layer 4 has a thickness of 20 mm and has an area weight of 200 gr/m². A stiffening layer 2 respectively 6 is arranged on each side of this core layer 4. These stiffening layers are attached to the core layer 4 by means of an adhesive layer 3, 5. In this preferred embodiment, a first stiffening layer 2 having an area weight of 200 gr/m² is arranged on the metal roofing sheet side and a second stiffening layer 6 having an area weight of 300 gr/m² is arranged on the passenger compartment side. It is to be understood that other suitable, that is stiff materials can be used for the stiffening layers. It is essential for the present invention that the individual layers described above are air permeable and that also the adhesive layers permit air to flow through. On the vehicle roof side there is arranged an air impermeable backing layer 1, preferably an air-tight sealing nonwoven having an area weight of 40 gr/m². By means of this backing layer 1 air is prevented from flowing from the passenger compartment through the air permeable lining 9 into the space between the vehicle roof A and the lining 9, which would lead to dirt accumulation. An air permeable decor layer 8, for example a decor nonwoven having an area weight of 200 gr/m² is arranged on the passenger compartment side. Preferably, a slitted foil 7 is disposed between the decor layer 8 and the second stiffening layer 6. This foil 7 opens when the entire stack is heated. The perforation density thus achieved can easily be predetermined by suitable arrangement and dimensioning of the perforations. The layers arranged on the passenger compartment side of the foam core are disposed in such a manner that on the passenger compartment side the lining has an air flow resistance of 500 $\text{Nsm}^{-3} > R_f < 3500 \text{ Nsm}^{-3}$, and in particular 900 $\text{Nsm}^{-3} < R_f < 1900 \text{ Nsm}^{-3}$, with an area weight of between 300 to 800 gr/m². In a further preferred embodiment the backing layer 1 is composed of an air impermeable nonwoven or an air impermeable foil or of a combination of nonwoven and foil and is attached (dot-wise or partially) to the vehicle roof A in such a manner that the sound absorption of the roof lining is optimized. If a relief-like profile is embossed into the reverse side of the roof lining element, this profile can be utilized for the dot-like or line-like attachment of the sealing foil. This relief-like profile of the reverse side of the lining in the moulded state causes the formation of a coherent thin and acoustically effective air layer between the roof lining and the metal roofing sheet. Thus, the roof lining has the effect of damping the oscillations of the metal roofing. The stiffening layers used in this preferred embodiment comprise a mixed nonwoven into which, among other things, strengthening fibers and/or fine or micro-fibers are admixed. These stiffening layers can also comprise co-extruded fibers which—in turn—comprise a fiber core made of polyester having a high melting point and a fiber coating comprising a copolymer having a low melting point.

In summary, the roof lining according to the invention is particularly advantageous because no noxious fumes are emitted and can be manufactured without the use of liquid adhesives which could lead to stains in the decor layer. Thanks to its simplicity the method of manufacture is particularly robust and stable. Trimming or adjusting the roof linings can be achieved in a simple manner.

The invention claimed is:

1. Inner roof lining for a vehicle roof (A) having
an air permeable core layer (4), which core layer (4), on the vehicle roof side, comprises a first air permeable stiffening layer (2) and on the passenger compartment side comprises a second air permeable stiffening layer (6),
whereby the second stiffening layer (6) on the passenger compartment side is provided with an air permeable décor layer(8),
wherein the first stiffening layer (2) on the vehicle roof side comprises an air impermeable backing layer (1), and wherein the first stiffening layer (2) and the core layer (4), as well as the core layer (4) and the second stiffening layer (6) and the décor layer (8) are attached to each other with the aid of air permeable adhesive layers (3, 5, 7),
whereby for producing an acoustically optimized vehicle roof inner lining, the combination of layers (5, 6, 7, 8) on the passenger compartment side of the core layer have a total air flow resistance in the range of 500 $\text{Nsm}^{-3} < R_f < 3500 \text{ Nsm}^{-3}$ and an area weight of between 300 gr/m² to 800 gr/m², and
wherein the backing layer (1) is provided on the vehicle roof side with an embossed relief-like profile.

2. The lining according to claim 1, wherein the air permeable core layer (4) is made of a thermoformable PU foam, having a thickness of 10 mm to 35 mm and a density of 8 to 30 kg/m³.

3. The lining according to claim 1, wherein at least one of the stiffening layers (2,6) is a thermoplastically bonded nonwoven, and having an area weight of 100 gr/m² to 250 gr/m² for the first stiffening layer (2) and an area weight of 150 gr/m² to 450 gr/m² for the second stiffening layer (6).

4. The lining according to claim 3, wherein the thermoplastically bonded nonwoven is composed of at least stiffening fibers, acoustically effective fibers and bonding fibers.

5. The lining according to claim 3, wherein at least one of the stiffening layers (2, 6) has a multi-layered structure and has one layer having a high tensile stiffness and one layer having a predetermined air flow resistance.

6. The lining according to claim 1, wherein at least one of the adhesive layers (3,5,7) is made of a reticulating adhesive, an adhesive fiber layer (polypropylene SMMS—Spunbond/Meltblown/Meltblown/Spunbond) or of a perforated and in particular a slitted foil.

7. The lining according to claim 1, consists of an air impermeable nonwoven, having an area weight of between 20 to 80 gr/m² and in particular 40 gr/m².

8. The lining according to claim 1, wherein the backing layer (1) comprises an air impermeable foil having a thickness of between 20 to 80 μm and of about 50 μm.

9. The lining according to claim 1, wherein the decor layer (8) comprises a nonwoven, having an area weight of between 100 to 300 gr/m², or comprises an air permeable fabric and/or foam.

10. An inner lining according to claim 1 in combination with a vehicle roof, wherein the inner lining is loosely adjacent to or is at least partially attached to, and in particular adhesed to said vehicle roof.

11. The lining according to claim 1, wherein the combination of layers (5, 6, 7, 8) on the passenger compartment side of the core layer have an air flow resistance in the range of 900 $\text{Nsm}^{-3} < R_f < 1900 \text{ Nsm}^{-3}$.

* * * * *